United States Patent [19]

Aughton

[11] Patent Number: 4,660,975
[45] Date of Patent: Apr. 28, 1987

[54] CONTROLLING LIGHT BEAM SPECTRUM

[75] Inventor: John E. Aughton, London, England

[73] Assignee: Crosfield Electronics Limited, London, England

[21] Appl. No.: 630,605

[22] Filed: Jul. 13, 1984

[30] Foreign Application Priority Data

Jul. 22, 1983 [GB] United Kingdom ................ 8319798

[51] Int. Cl.⁴ ............................ G01J 3/06; G01J 3/32
[52] U.S. Cl. .................................. 356/308; 356/326; 356/332
[58] Field of Search ............... 356/308, 326, 328, 332, 356/334, 405

[56] References Cited

U.S. PATENT DOCUMENTS

| | | | |
|---|---|---|---|
| 3,314,327 | 4/1967 | Killpatrick et al. | |
| 3,561,872 | 2/1971 | Grabowski et al. | 356/326 |
| 3,868,499 | 2/1975 | Aaronson | 356/334 |
| 3,907,430 | 9/1975 | Mann | 356/332 |
| 4,015,130 | 3/1977 | Landry et al. | 250/372 |
| 4,165,180 | 8/1979 | Failes | 356/310 |
| 4,225,233 | 9/1980 | Ogan | 356/334 |
| 4,235,518 | 11/1980 | Greiner | |

FOREIGN PATENT DOCUMENTS 3005352 8/1981 Fed. Rep. of Germany .

OTHER PUBLICATIONS

Lipsett et al, "Varioluminator (Substrative Double Monochromator with Variable Bandpass)" Applied Optics, vol. 12#4, Apr. 1973, pp. 818-821.
Burch, "Adjustable Bandpass Filter Employing a Prism" Applied Optics, Mar. 1969, vol. 8#3, pp. 649-651.
Talmi, "Applicability of T.V. Type Multichannel Detectors to Spectroscopy" Analyical Chemistry, vol. 47#7, Jun. 1975, pp. 658A-670A.
Greynolds, "Computer-Assisted Design of Well-Baffled Axially Symmetric Optical Systems" SPIE, vol. 193, Optical Systems Engineering (1979), pp. 129-140.

Primary Examiner—Vincent P. McGraw
Attorney, Agent, or Firm—Sughrue, Mion, Zinn, Macpeak & Seas

[57] ABSTRACT

A method and apparatus for controlling the spectral components of a light beam are described. The apparatus comprises means (3-7) for generating a collimated light beam; means (9) for dispersing the collimated beam; a mask (1) including an aperture (2) the size of which is such that a portion of the dispersed beam passes through the aperture in use; and movement means (not shown) for causing relative transverse movement between the light beam and the aperture. A memory (not shown) is provided for storing in use a profile of the relative transverse movement between the light beam and the aperture (2) required to obtain a desired spectral response in the transmitted light beam, the movement means being responsive to the stored profile to cause relative transverse movement in accordance with the predetermined profile.

9 Claims, 10 Drawing Figures

CONTROLLING LIGHT BEAM SPECTRUM

The invention relates to a method and apparatus for controlling the spectral components of a light beam.

There are a number of applications where it is desirable to be able to control accurately the spectral components of a light beam and one particularly important application is that of colour image scanning. In this application, a colour image, such as a transparency, which is to be electronically stored or reproduced must first be scanned. This is achieved conventionally by sequentially illuminating the image with, for example, red, green, and blue light and storing data representing the degree of transmittance of each pixel of the image to each form of illumination for subsequent storage and preparation of corresponding colour separations. Such apparatus is embodied in our Crosfield Magnascan 600 series.

In the past, light beams of specified spectral components have been generated simply by positioning appropriate coloured filters in the light path. With the advent of sensitive detectors, particularly charge coupled device (CCD) arrays this simple method of generating controlled light beams is no longer sufficiently accurate for the detectors being used. Moreover, the performance of lamps and other optical components and their coatings tends to vary with time and such variations have not previously been compensated for.

An alternative method to the use of coloured filters has previously been proposed. This involves dispersing a collimated beam and providing a mask including an aperture in the path of the light beam, the size of the aperture being such that only a portion of the dispersed beam passes through the aperture. With this method a light beam of accurately determined spectral content can be generated. Such methods are illustrated in U.S. Pat. No. 3,907,430 and a paper entitled "Varioilluminator by Messrs. Lipsett, Oblinsky, and Johnson in Applied Optics Vol. 12, No. 4, April 1973. Both of these prior proposals illustrate laboratory instruments which are very precise and in practice can only be produced in small numbers. For example, in the apparatus disclosed in the previously mentioned paper, micrometers are used to position the mask aperture.

A further problem with these systems is that the distribution of wavelength in space is not linear since the refractive index of the dispersing medium tends to vary with wavelength. This makes the method difficult to apply to other scanning applications where frequent changes in spectral content are required.

In accordance with one aspect of the present invention, a method of controlling the spectral components of a light beam comprises generating a collimated light beam; dispersing the collimated beam; and providing a mask including an aperture in the path of the light beam, the size of the aperture being such that only a portion of the dispersed beam passes through the aperture, relative transverse movement between the aperture and the dispersed beam controlling the spectral components of the light beam transmitted through the aperture characterised by predetermining a profile of the relative transverse movement between the light beam and the aperture required to obtain a desired spectral response in the transmitted light beam; and regularly causing relative transverse movement between the light beam and the aperture in accordance with the predetermined profile.

We have discovered that it is possible to determine the relative transverse movement between the light beam and the aperture which is necessary to obtain a desired spectral response and it is also possible to take account of variations in detector performance and variations in lamp quality and the performance of optical components and their coatings.

Preferably, the relative transverse movement is caused to occur in a cyclic manner. This is particularly useful in the case of colour scanning apparatus in which an accurate repeating sequence of illuminating beams is required.

Preferably, the step of predetermining the profile comprises:
(a) simulating in a suitably programmed computer the dispersed light beam and the aperture during relative transverse movement therebetween in accordance with a test profile;
(b) simulating the spectral content of the transmitted light beam;
(c) displaying the spectral response of the simulated transmitted light beam corresponding to the test profile;
(d) modifying the test profile; and
(e) repeating steps (a)-(d) until a desired spectral response is obtained nd thereupon storing the final profile.

The method is particularly suited to use in conjunction with a suitably programmed computer which can be supplied with data representative of lamp performance, mask size and the like to generate the spectral response of a simulated transmitted light beam corresponding to one or more test profiles. The profile can then be modified by an operator and the simulation steps repeated until a desired spectral response is obtained.

Typically, the profile will be represented by values representing the position of the aperture relatively to the light beam with respect to time. Alternatively, the profile could be represented by the velocity of the aperture relatively to the light beam with respect to relative movement between them.

In accordance with a second aspect of the present invention, apparatus for controlling the spectral components of a light beam comprises means for generating a collimated light beam; means for dispersing the collimated beam; a mask including an aperture the size of which is such that a portion of the dispersed beam passes through the aperture in use; and movement means for causing relative transverse movement between the light beam and the aperture characterised in that the apparatus further comprises a memory for storing in use a profile of the relative transverse movement between the light beam and the aperture required to obtain a desired spectral response in the transmitted light beam, the movement means being responsive to the stored profile to cause relative transverse movement in accordance with the stored profile.

Preferably, the movement means comprises a galvanometer having a spindle linked to the mask, the spindle moving in response to control signals corresponding to the profile stored in the memory. A galvanometer is convenient since it comprises an instrument which has an accurate response to an applied signal. In addition, the size of the slit may also be varied to provide even more accurate control of the spectral components of the light beam. Alternatively, the speed of movement of the aperture relatively to the light beam can be altered to achieve the same effect.

Conveniently, a computer is provided which is programmed to simulate the light beam, and the aperture during relative transverse movement therebetween in response to a test profile, the apparatus further comprising display means for displaying the spectral response of the transmitted light beam corresponding to the test profile. The operator can then review the displayed spectral response and if it is not satisfactory he can alter the test profile and cause the computer to simulate the light beam and the aperture in response to the revised profile. Preferably, the display means comprises a device for graphically illustrating the spectral response.

One particularly important application of the invention is in colour scanning apparatus which comprises apparatus in accordance with the second aspect of the present invention, wherein the mask aperture comprises a slit, the colour scanning apparatus further comprising a linear detector array which is exposed to the light beam transmitted through the aperture after the light beam has passed through an image, and control means for discharging the linear detector array at predetermined times during relative movement between the slit and the dispersed light beam whereby the transmittance of a line of the image to light beams of different spectral content is determined.

Preferably, the control means additionally causes relative movement between the image and the beam impinging on the image after the image has been exposed to the desired spectral components and while the dispersed light beam and the aperture return to their initial relative position under the control of the movement means. This arrangement enables very fast scanning to be carried out with the image being moved so that the next line is exposed while the dispersed light beam and the aperture return to their initial relative positions. In addition, at this stage, the linear detector array may be discharged.

An example of colour scanning apparatus including apparatus in accordance with the present invention will now be described with reference to the accompanying drawings, in which.

Figure 1A:
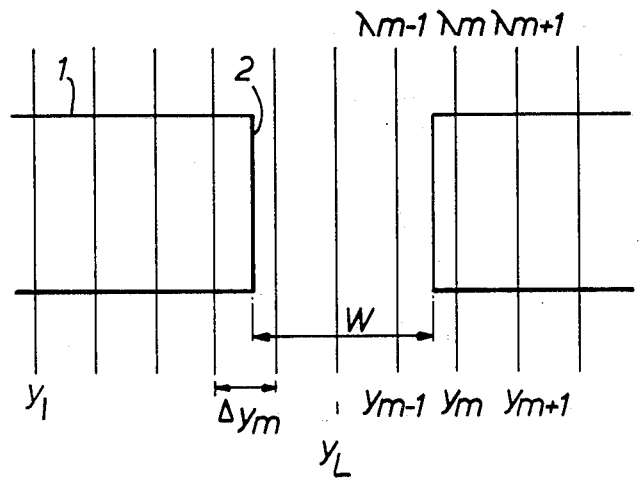
FIGS. 1A and 1B illustrate diagrammatically the distribution of wavelengths across a dispersed light beam with the mask in a first position.

Before describing the apparatus of this example, the theory behind the invention will be described in more detail with reference to FIGS. 1 to 3. Each of these figures illustrates a mask 1 having an aperture 2 with a width W. The vertical lines in the Figures illustrate schematically the positions of typical wavelengths across a dispersed light beam. FIG. 1A illustrates the wavelengths ($\lambda_m$) at equal spatial separations ($y_m$). However, in general $\lambda_m - \lambda_{m-1}$ will not equal $\lambda_{m+1} - \lambda_m$. This is because the dispersion of a previously collimated light beam depends on the geometry and refractive index of the dispersing medium, such as a prism, and varies non-linearly with wavelength. FIG. 1A should be contrasted with FIG. 1B which illustrates the positions of wavelengths which are equally spaced in wavelength but, as has just been mentioned, will not necessarily be equally spaced in distance. These wavelengths are labelled $\lambda_n$ and are positioned at $y_n$. Thus, in FIG. 1B, $y_n - y_{n-1}$ will not in general equal $y_{n+1} - y_n$.

Figure 1B:
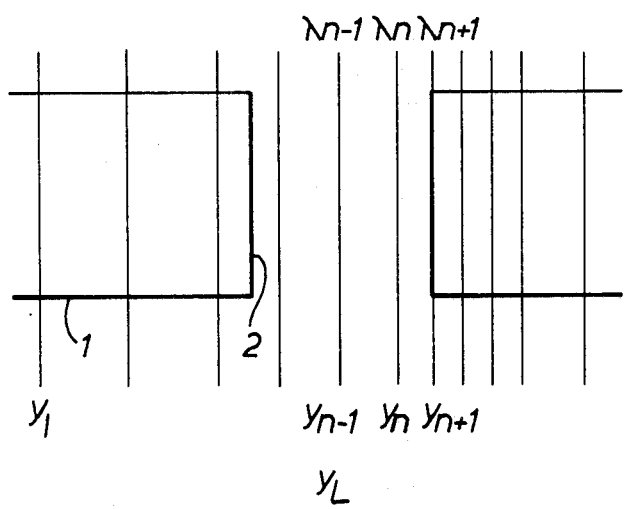

Thus, to control the spectral components of the light beam transmitted through the aperture 2 by suitably positioning the mask 1 it is necessary to translate from the wavelength domain illustrated in FIG. 1B from which desired spectral responses are determined to the spatial domain illustrated in FIG. 1A.

Figure 2A:
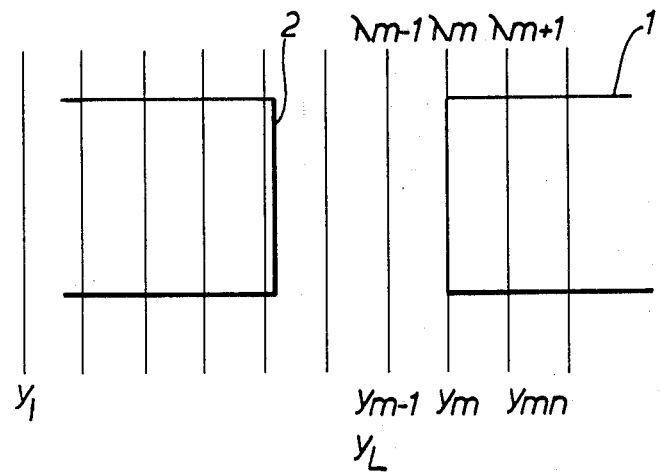
FIGS. 2A and 2B are views similar to FIGS. 1A and 1B respectively but with the mask in a second position.
Figure 2B:
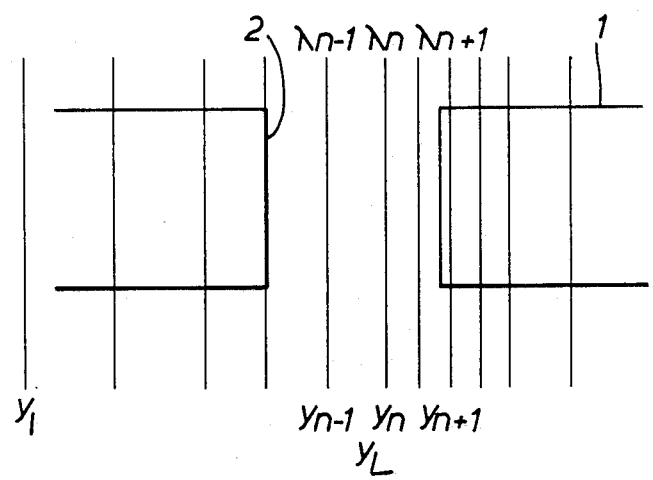
Figure 3A:
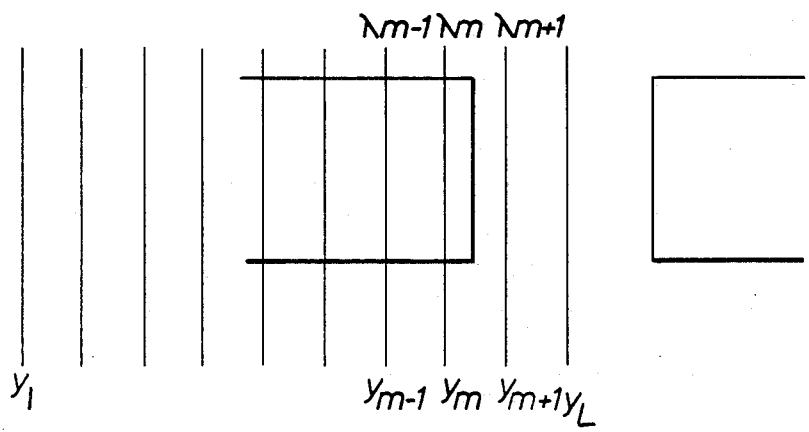
FIGS. 3A and 3B are views similar to FIGS. 1A and 1B respectively but with the mask in a third position.
Figure 3B:
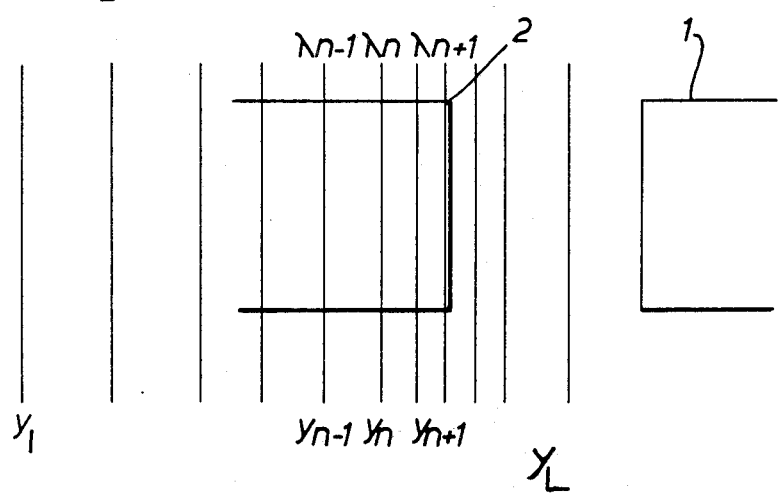

This translation between the wavelength domain and the displacement domain is achieved using the following algorithm which we have devised;

$$\frac{\lambda_m - \lambda_n}{\lambda_{n+1} - \lambda_n} = \frac{y_m - y_n}{y_{n+1} - y_n} = \frac{\Delta NE(\lambda_m) - \Delta Ne(\lambda_n)}{\Delta Ne(\lambda_{n+1}) - \Delta Ne(\lambda_n)}$$

where
$\Delta Ne(\lambda_n) \equiv$ No of photo-electrons generated in bandwidth $(\lambda_n \pm \frac{1}{2}\Delta\lambda_n)$ in a cycle time $\tau$
$\Delta Ne(\lambda_m) \equiv$ No of photo-electrons generated in bandwidth $(\lambda_m \pm \frac{1}{2}\Delta\lambda_n)$ in a cycle time $\tau$
Next the resultant $\Delta Ne(\lambda_m)$ is converted to $\Delta Ne(y_m)$ by:

$$\Delta Ne(y_m) = \frac{\Delta Ne(\lambda_m) \cdot \Delta y_m}{y_{n+1} - y_n}$$

where
$\Delta Ne(y_m) \equiv$ No of photo-electrons generated in bandwidth $(y_m \pm \frac{1}{2}\Delta_m)$ in a cycle time $\tau$ A third domain, time, is required to calculate where the edges of the aperture 2 are as the mask 1 moves across the dispersed beam. This movement can be seen by comparing FIG. 1 with FIGS. 2 and 3. FIGS. 1A and 1B illustrate the mask 1 with its right hand edge positioned at the beginning of the wavelength band centred on $\lambda_m$, FIGS. 2A and 2B illustrate the mask 1 in an intermediate position after movement to the right as seen in the drawings, and FIGS. 3A and 3B illustrate the mask 1 with the left hand edge of the aperture 2 having just left the waveband centred on $\lambda_m$.

A function generator, such as a suitably programmed microcomputer, then determines the position, $y_L$, of the centre of the aperture 2 relatively to an initial position $y_1$ at a number of different times $t_L$ separated by equal time periods over a cycle period $\tau$. This can be achieved in two ways. The simplest method is for the function generator to provide a listing, for example as shown in the table below.

| $t_L$ | $y_L$ |
|---|---|
| $t_1$ | $y_1$ |
| $t_2$ | $y_2$ |
| . | . |
| . | . |
| . | . |

A typical time interval between successive times $t_L$ is 1 millisecond.

Alternatively, the function generator can determine a power law relating the position of the centre of the aperture 2 with time between successive pairs of break points q. Typically, the break points q are defined as the times at which a CCD array is discharged and correspond generally to the times between which predominantly red, blue, and green light passes through the aperture 2 respectively. This may be expressed mathematically as follows:

$$\frac{(y_L - y_{q-1})}{(y_q - y_{q-1})} = \left(\frac{t_L - t_{q-1}}{t_q - t_{q-1}}\right)^p$$

where p is a power chosen so that the boundary conditions are satisfied and $y_q$ and $y_{q-1}$ are values of $y_L$ at $t_L = t_q$, $t_{q-1}$ respectively.

Other methods of generating a suitable function may be used instead.

Figure 6:
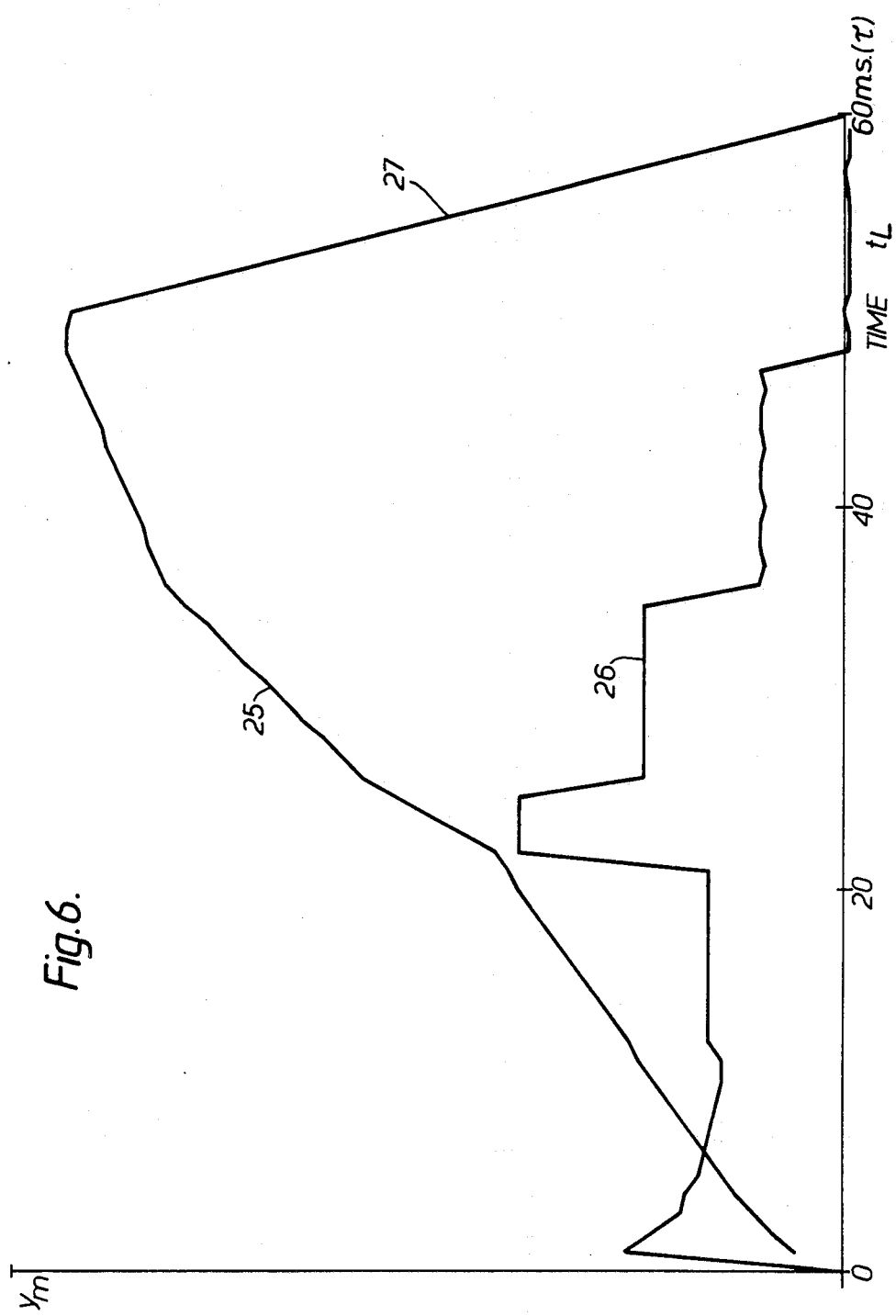
FIG. 6 illustrates an example of a profile.

An example of a function generated by a function generator will be described in more detail later but is illustrated by a line 25 in FIG. 6. In this example, the break points correspond to 24, 36, and 48 milliseconds respectively. A further boundary condition occurs at 0 milliseconds.

The next stage is to calculate the effective charge accumulation time $\Delta t_m$ at each position $y_m$. This is simply the time for which any particular bandwidth in the spatial domain is visible through the aperture 2. This corresponds to the time for the aperture 2 to move from the position shown in FIG. 1A to the position shown in FIG. 3A where the bandwidth is defined as $y_m \pm \frac{1}{2}\Delta y_m$. The effective charge accumulation time can be calculated in a straight forward manner.

The ratio of this charge accumulation time ($\Delta t_m$) to the overall cycle time ($\tau$) is the ratio of photo-electrons actually generated in the aperture scan to those it is possible to generate without the obstruction. That is:

$$\Delta n(y_m) = \Delta Ne(y_m) \times \frac{\Delta t_m}{\tau}$$

This can be returned to the wavelength domain in two steps. Firstly, $\Delta n(y_n)$ is determined using:

$$\frac{\Delta n(y_n) - \Delta n(y_m)}{\Delta n(y_{m+1}) - \Delta n(y_m)} = \frac{y_n - y_m}{\Delta y_m}$$

where $y_m \leq y_n \leq y_{m+1}$.

Secondly, the following equation is applied:

$$\Delta n_c(\lambda_n) = \Delta n(y_n) \cdot \frac{(y_{n+1} - y_n)}{\Delta y_m}$$

where
$\Delta n(y_m) \equiv$ No of photo-electrons generated in bandwidth ($y_m \pm \frac{1}{2}\Delta y_m$) with aperture scan.
$\Delta n(\lambda_n) \equiv$ No of photo-electrons generated in bandwidth ($\lambda_n \pm \frac{1}{2}\Delta\lambda_n$) with aperture scan.

Figure 7:
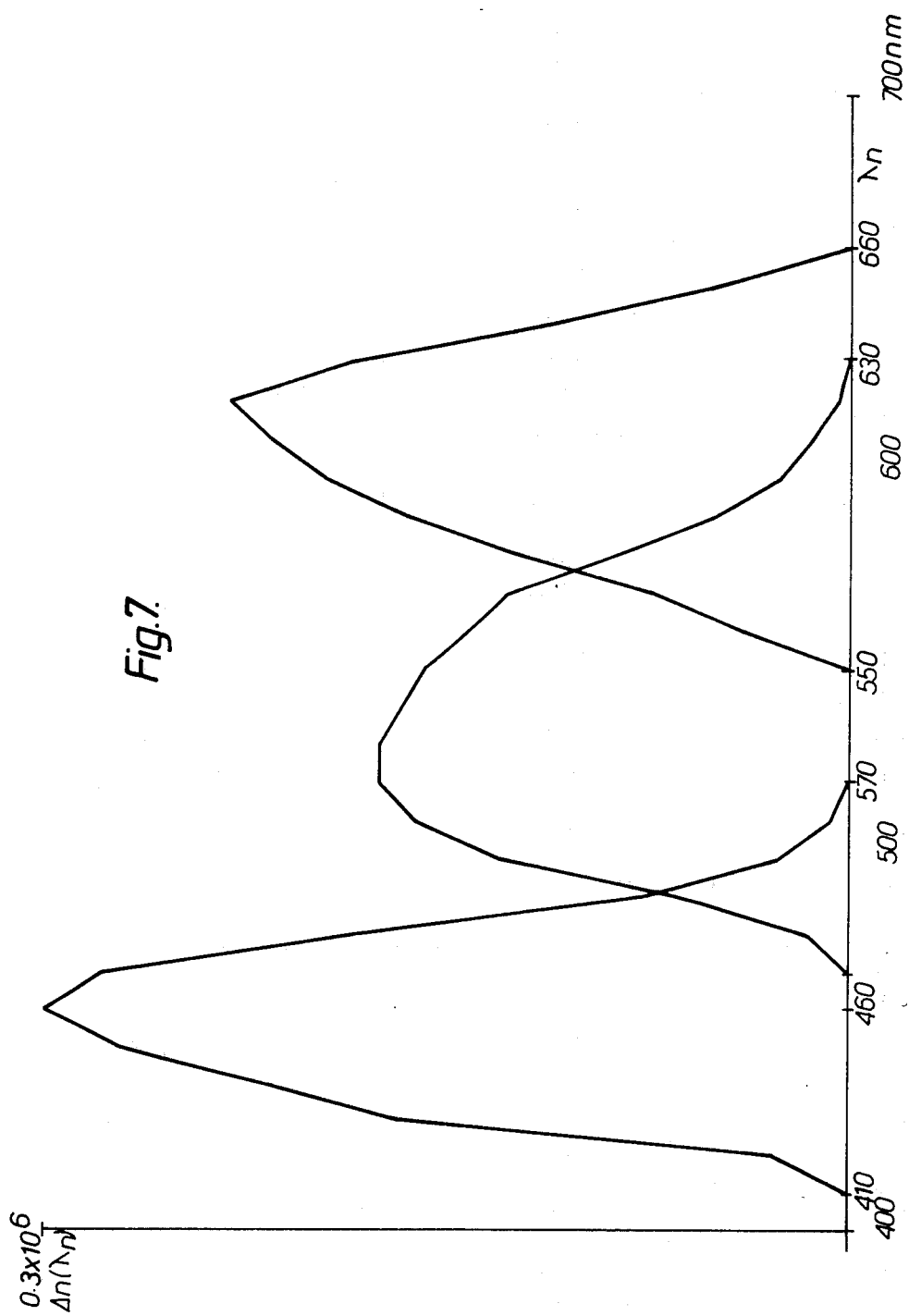
FIG. 7 illustrates the spectral response resulting from the profile shown in FIG. 6.

Hence $\Delta n(\lambda_n)$ is the spectral response of the system expressed by the number of detected photo-electrons at equal wave-length intervals. This is illustrated in FIG. 7.

This is then summated to give the total number of photo-electrons in a detector (CCD) element in each integration period. In this way, for a given movement profile $y_L$ of the mask 1 the spectral response of the transmitted beam can be determined.

Figures 4, 5:
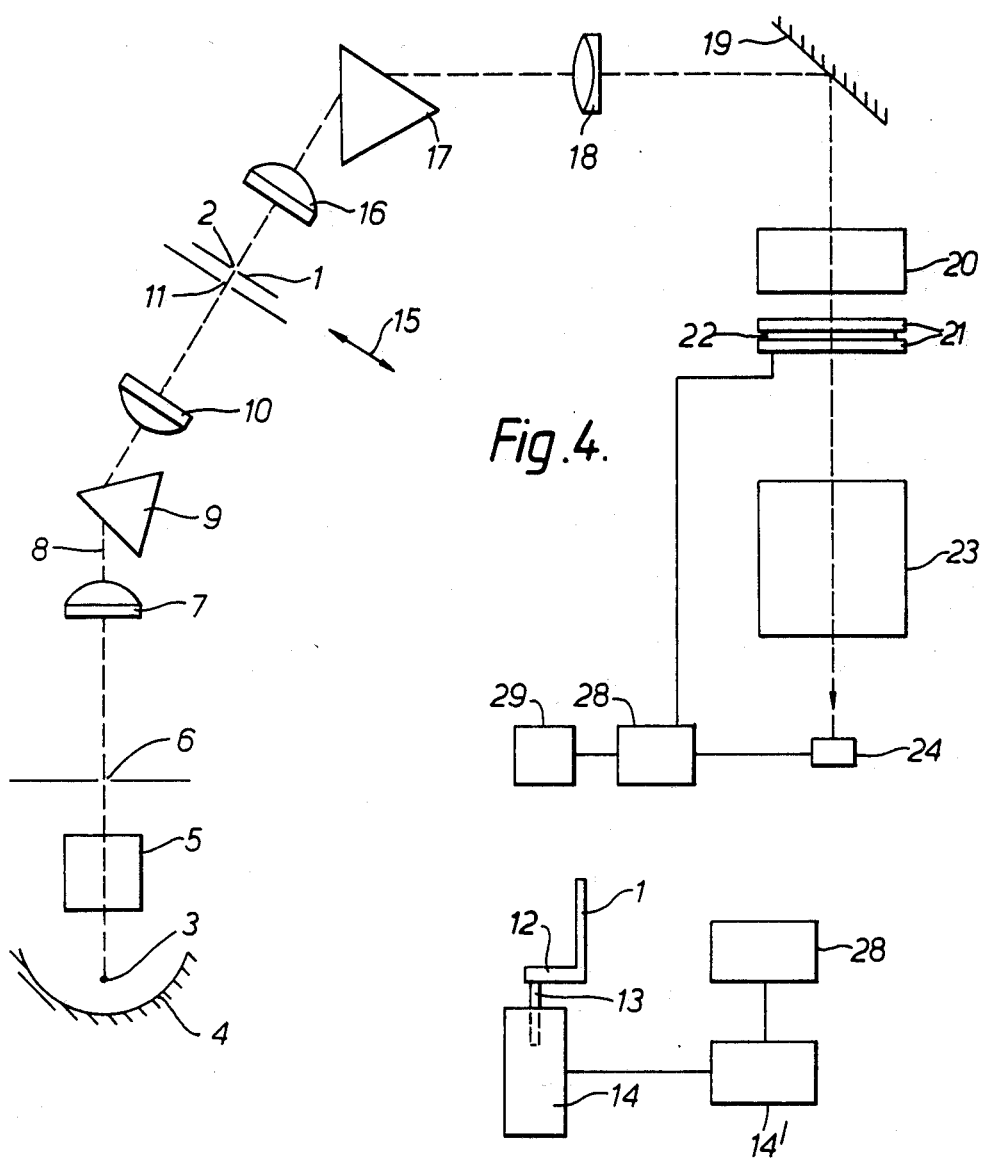
FIG. 4 is a schematic view of the apparatus.
FIG. 5 illustrates a portion of the apparatus shown in FIG. 4 in more detail.

FIG. 4 illustrates apparatus for use in colour scanning apparatus. This comprises a light source 3, for example a quartz halogen filament lamp, backed by a reflector 4. Light from the source 3 passes through a condenser lens 5 and a collimator slit 6. The slit 6 lies in the front focal plane of a collimator lens 7 which thus generates a collimated light beam 8 which enters a dispersing prism 9. The dispersed light beam leaving the dispersing prism 9 passes through a telescope objective lens 10 and forms a continuous spectrum in the plane of a spectral limit slit 11.

The spectral limit slit 11 is adjustable so that unwanted infra-red and ultra-violet wavelengths are cut off and all wanted wavelengths are transmitted.

Downstream of the spectral limit slit 11 is positioned the mask 1 at the spectral image plane of the slit 6. The mask 1 has a central slit 2 extending vertically into the paper in FIG. 4 The mask 1 is mounted to an arm 12 fixed to a spindle 13 of a galvanometer 14 (FIG. 5). A suitable galvanometer is a Model G310 sold by General Scanning Inc. The galvanometer 14 is connected to an EPROM 14' which stores a previously generated profile (to be described below) and is controlled in use via the EPROM to cause movement of the spindle 13 into and out of the paper as shown in FIG. 5 in accordance with the stored profile. Thus of the spindle 13 into and out of the paper as shown in FIG. 5 in accordance with the stored profile. Thus movement of the mask 1 is in a direction transverse to the light beam as indicated by an arrow 15.

As an alternative to the galvanometer 14, any other suitable means may be used to move the mask 1 but this is preferably electro-mechanical, for example a load speaker coil. As has previously been described, the position of the slit 2 is controlled so that only a portion of the light beam passing through the slit 11 will be transmitted through the slit 2 and that portion has a known spectral composition such as predominately red, predominately green, and predominately blue in sequence.

The light beam then enters a second collimator 16, a dispersion prism 17, and a objective lens 18 which together form an optical inversion of the lenses 7, 10 and the prism 9. Thus, an undispersed beam of known spectral composition leaves the objective lens 18 and is reflected by a mirror 19 through a condenser system 20 to a film holder 21. In some cases the prism 17 may be omitted to leave a dispersed beam.

A transparency 22 is sandwiched within the film holder 21 so that an undispersed image of the original collimator slit 6 will be formed at the film holder 21 to expose a line of the image on the transparency 22. The condenser system 20 reforms an image of the light source 3 at the puil of an imaging lens 23 and the imaging lens 23 relays the illuminated line of the image of the transparency 22 onto a detector array 24.

Conveniently, the detector array 24 comprises a CCD array which has 3456 elements closely spaced in a straight line extending into the paper as seen in the drawing. A transparency of about 5.5 cm×5.5 cm is provided. The method of operation of the detector array 24 is such that a charge is accumulated at each detector element during the time period that a line of the image of the transparency 22 is exposed to the light beam, this charge being dependent on the number of photo-electrons of light energy falling on the detector element during that time. At the end of the time period and under the control of a computer 28, the charge pattern is discharged and the signals from the individual elements are read off by conventional means (not shown). The next set of charge signals are then accumulated.

Before the apparatus is used for scanning a transparency, a computer simulation of the light beam transmitted from the prism 9 and of the mask 1 is carried out. The computer may conveniently be provided by the computer 28 which is suitably programmed with the algorithms previously set out. The computer may comprise a D.E.C. PDP11 with the RSX operating system. In addition, data such as the size of the prism 9, the prism angle and glass type together with the size of the slit 2 and its thickness are input by an operator to enable the distribution of wavelengths in the wavelength domain to be calculated. The computer 28 then converts this information into the spatial domain. Subsequently, a profile of the position of the slit 2 relatively to the dispersed light beam is read into the computer. Such a profile is illustrated graphically by a line 25 in FIG. 6. A line 26 represents the differential of the line 25 and thus represents the velocity of the slit 2 relatively to the light beam as a function of time. This second line 26 is generated to ensure the capabilities of the galvanometer 14 are not exceeded. Using this profile and the supplied algorithms for calculating the number of photo-electrons passing through the slit the computer can determine the spectral response of the transmitted light beam during movement of the slit across the dispersed beam in accordance with the profile. An example of such a response is illustrated graphically in FIG. 7. The curves shown in FIG. 7 have been generated by calculating the total number of photo-electrons transmitted in 10 nm wavelength bands.

The operator then reviews the spectral response curves which are graphically displayed on a printer 29 and if they are not satisfactory repeats the simulation with a different profile. Once a satisfactory response is obtained a fly back instruction is included illustrated by a portion 27 of the line 25 in FIG. 6 and the full profile is then transferred to the EPROM 14' to control the galvanometer 14.

When the apparatus has been set up the galvanometer 14 is controlled by the EPROM 14' to cause the slit 2 to traverse the dispersed beam with the mask 1 following the determined profile so that the transparency 22 is sequentially illuminated by light beams having wavelengths centred at about 460, 530, and 620 nm successively. The computer 28 causes the array 24 to discharge to a conventional store at times of 24 ms, 36 ms and 48 ms from the start of the pass, the first two of these times corresponding to the transition times between the light beams. After this pass, the EPROM 14' causes the galvanometer to fly back to its initial position. In addition, during this period the film holder 21 is moved by means not shown to the right or left as seen in the drawing under control of the computer 28 so that the next adjacent line of the image can be exposed. The process is then repeated until the entire transparency 22 is scanned.

In the example described, the width W of the slit 2 is 0.2 mm and the thickness of the mask is 3.0 mm.

I claim:

1. A method of controlling the spectral components of a light beam, the method comprising generating a collimated light beam; dispersing said collimated beam; providing a mask defining an aperture in the path of said light beam, the size of said aperture being such that only a portion of said dispersed beam passes through said aperture, whereby relative transverse movement between said mask and said dispersed beam controls the spectral components of said light beam transmitted through said aperture; predetermining a profile of said relative transverse movement between said light beam and said mask required to obtain a desired spectral response in said transmitted light beam by,
   (a) simulating in a suitably programmed computer said dispersed light beam and said aperture during relative transverse movement therebetween in accordance with a test profile;
   (b) simulating the spectral content of said transmitted light beam;
   (c) displaying the spectral response of said simulated transmitted light beam corresponding to said test profile;
   (d) modifying said test profile; and
   (e) repeating steps (a)-(d) until a desired spectral response is obtained and thereupon storing the final profile;
and regularly causing relative transverse movement between said light beam and said mask in accordance with said predetermined profile.

2. A method according to claim 1, wherein said relative transverse movement is caused to occur in a cyclic manner.

3. A method according to claim 1, wherein each of said profiles is represented by values representing the position of said aperture relatively to said light beam with respect to time.

4. Apparatus for controlling the spectral components of a light beam, the apparatus comprising means for generating a collimated light beam; means for dispersing said collimated beam; a mask defining an aperture the size of which is such that a portion of said dispersed beam is adapted to pass through said aperture; movement means for causing relative transverse movement between said light beam and said mask; a memory adapted to store a profile of said relative transverse movement between said light beam and said mask required to obtain a desired spectral response in said transmitted light beam, said movement means being adapted to cause relative transverse movement in accordance with said stored profile; computing means programmed to simulate said light beam and said mask during relative transverse movement therebetween in response to a test profile and, the apparatus further comprising display means adapted to display the spectral response of said transmitted light beam corresponding to said test profile, whereby a final profile is stored in said memory.

5. Apparatus according to claim 4, wherein said movement means comprises a galvanometer having a spindle linked to said mask, the spindle being adapted to move in response to control signals corresponding to said profile stored in said memory.

6. Apparatus according to claim 4, wherein said display means comprises a device for graphically illustrating said spectral response.

7. Colour scanning apparatus for scanning an image comprising apparatus in accordance with claim 4, wherein said mask aperture comprises a slit, and said colour scanning apparatus further comprises a linear detector array adapted to be exposed to said light beam transmitted through said aperture after said light beam has passed through said image, and control means adapted to discharge said linear detector array at predetermined times during relative movement between said slit and said dispersed light beam whereby the transmittance of a line of said image to light beams of different spectral content is determined.

8. Colour scanning apparatus according to claim 7, wherein said control means additionally is adapted to cause relative movement between said image and said beam impinging on said image after said image has been exposed to the desired spectral components and while said dispersed light beam and said aperture return to their initial relative position under the control of said movement means.

9. Colour scanning apparatus according to claim 7, wherein said linear detector array comprises a CCD array.

* * * * *